(12) United States Patent
Pahkala et al.

(10) Patent No.: US 12,732,103 B2
(45) Date of Patent: Sep. 8, 2026

(54) POWER CONVERTER CONTROL LOOP GAIN ADAPTATION

(71) Applicant: Texas Instruments Incorporated, Dallas, TX (US)

(72) Inventors: Janne Pahkala, Oulu (FI); Ari Vaananen, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/591,071

(22) Filed: Feb. 29, 2024

(65) Prior Publication Data

US 2025/0279723 A1 Sep. 4, 2025

(51) Int. Cl.
*H02M 3/15* (2006.01)
*H02M 3/157* (2006.01)
*H02M 3/158* (2006.01)

(52) U.S. Cl.
CPC .......... *H02M 3/157* (2013.01); *H02M 3/158* (2013.01)

(58) Field of Classification Search
CPC .............................. H02M 3/157; H02M 3/158
See application file for complete search history.

(56) References Cited

U.S. PATENT DOCUMENTS 6,934,779 B1 * 8/2005 Broach .................... H04L 5/02 710/69
8,779,746 B2 7/2014 Ye et al.
9,098,103 B1 8/2015 Milanesi et al.
9,584,019 B2 2/2017 Shiwaya
10,097,077 B2 10/2018 Xu et al.
10,312,811 B2 6/2019 Villot et al.
10,523,112 B2 12/2019 Yan et al.
10,879,811 B2 * 12/2020 Fukushima ............ H02M 1/32
11,251,705 B2 2/2022 Sigamani et al.
11,342,842 B2 5/2022 Ozalevli et al.
11,394,299 B2 7/2022 Lazaro et al.
11,594,968 B2 2/2023 Fishelov et al.
2011/0234276 A1 * 9/2011 Kaneko .................. H03L 7/099 327/103
2012/0025792 A1 2/2012 Lipcsei et al.
2019/0140538 A1 * 5/2019 Buthker .............. H05B 45/375

* cited by examiner

*Primary Examiner* — Daniel C Puentes
(74) *Attorney, Agent, or Firm* — Charles F. Koch

(57) ABSTRACT

Described embodiments include a circuit having a comparator with first and second comparator inputs and a comparator output. The second comparator input is coupled to a ripple reference voltage terminal. A switch is coupled between the first comparator input and a ground terminal, and has a switch control terminal that is coupled to the comparator output. A capacitor is coupled between the first comparator input and the ground terminal. A first current source is coupled between a supply terminal and the first comparator input, and has a first current control terminal. A second current source is coupled between a current output terminal and the ground terminal, and has a second current control terminal.

15 Claims, 5 Drawing Sheets

POWER CONVERTER CONTROL LOOP GAIN ADAPTATION

BACKGROUND

This description relates to switching power converters. Switching power converters receive a direct-current (DC) input voltage and provide an output at a specified DC voltage within a specified current limit. A typical switching converter includes a power stage with switches, an output capacitor, and an inductor. A typical switching converter may also include a converter control circuit to control the switches of the power stage. The power converter may include the capability to transition from a first operational mode to a second operational mode in response to load changes (e.g. light load to heavy load, or heavy load to light load). However, these mode transitions can sometimes be problematic by causing inefficient operation and ripple on the output voltage and current.

Some switching power converters may operate in both a pulse width modulation (PWM) mode and in a pulse frequency modulation (PFM). In some current mode power converters, a timer-based PFM mode may be used to adjust the PFM frequency. The gain of the control loop while operating in PFM mode usually depends on the PFM pulse size and the gain of the PFM timer. However, the PFM pulse size can vary depending on the duty cycle ratio and the inductance of an output inductor while operating in PWM mode

SUMMARY

In a first example, a circuit includes a comparator having first and second comparator inputs and a comparator output. The second comparator input is coupled to a ripple reference voltage terminal. A switch is coupled between the first comparator input and a ground terminal, and has a switch control terminal that is coupled to the comparator output.

A capacitor is coupled between the first comparator input and the ground terminal. A first current source is coupled between a supply terminal and the first comparator input, and has a first current control terminal. A second current source is coupled between a current output terminal and the ground terminal, and has a second current control terminal.

In a second example, a control circuit includes a clock circuit having a clock output, and a logic circuit having first, second, third and fourth logic circuit inputs and first, second and third logic circuit outputs. The first logic circuit input is coupled to the clock output. A digital-to-analog converter (DAC) has a DAC input and a DAC output. The DAC input is coupled to the first logic circuit output. A voltage-to-current converter (V2I) having first and second V2I inputs and first, second and third V2I outputs, wherein the first V2I input is coupled to the DAC output.

A timer circuit has first, second, and third timer outputs, wherein the first timer output is coupled to the first V2I input, the second timer output is coupled to the second V2I input, and the third timer output is coupled to the third logic circuit input. An amplifier having first and second amplifier inputs and an amplifier output, wherein the first amplifier input is coupled to a voltage feedback terminal, the second amplifier input is coupled to a voltage reference terminal, and the amplifier output is coupled to the second V2I input.

DETAILED DESCRIPTION

In this description, the same reference numbers depict same or similar (by function and/or structure) features. The drawings are not necessarily drawn to scale.

Some switching power converters are designed to operate in both a pulse width modulation (PWM) mode and in a pulse frequency modulation (PFM), and to transitions from one mode to the other during operation. Usually, in valley current mode buck power converters, a control loop adapts an inductor current valley point during operation in PWM mode. When operating in PFM mode, the same control loop can be used to adapt the frequency of the PFM pulses by controlling a PFM timer. The PFM timer determines the frequency of the PFM pulses using the output voltage of the loop filter error amplifier.

The control loop gain depends on the PFM pulse size when the PFM timer is used to control the switching frequency in PFM mode. Variations in arise in the control loop gain due to variations in the inductance of the output inductor, duty cycle ratio, and PWM switching frequency. This variation in gain in PFM mode can cause degraded load transient performance, voltage disturbances, and mode bouncing during entry to and exit from PFM mode.

Figure 1:
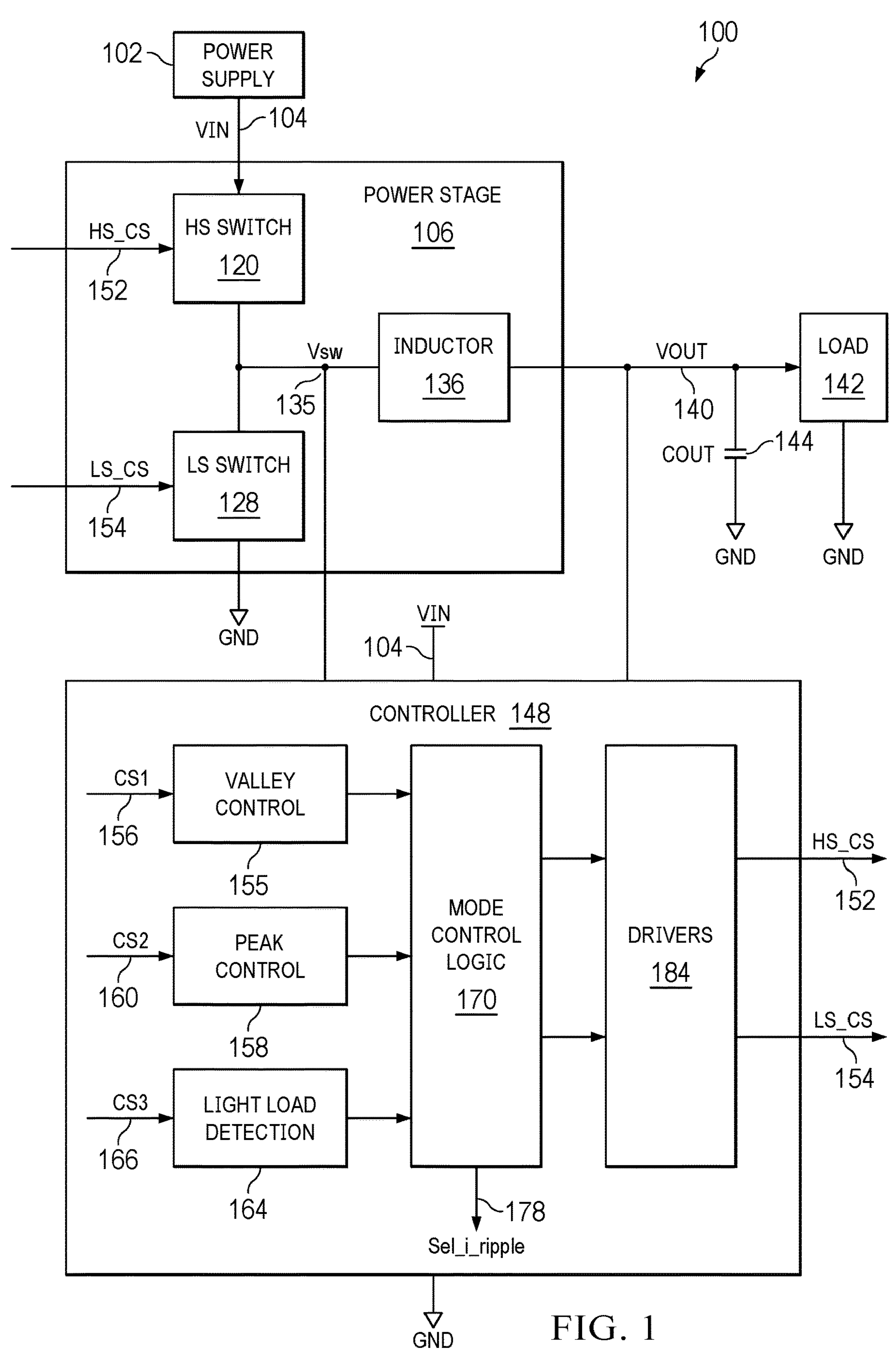
FIG. 1 shows a block diagram for an example power converter system.

FIG. 1 is a block diagram for an example power converter system 100. The power converter system 100 includes a power supply 102, a power stage 106, an output capacitor $C_{OUT}$ 144, a load 142, and a controller 148. The power stage 106 includes a high-side (HS) switch 120, a low side (LS) switch 128, and an inductor 136 coupled to the HS switch 120 and the LS switch 128 at a switching terminal 135. In at least some examples, the HS switch 120, LS switch 128, and related drivers are components of an integrated circuit (IC), and the inductor 136 is an external component separate from the IC. In at least one example, power converter system 100 is a buck power converter, which implies that the output voltage ($V_{OUT}$) is lower than the input voltage ($V_{IN}$).

The HS switch 120 is coupled between the input voltage terminal VIN 104 and the LS switch 128, and has a control terminal that receives a control signal HS_CS 152. Power supply 102 provides an input voltage $V_{IN}$ 104 to HS switch 120. The LS switch 128 is coupled between the LS switch 128 and a ground terminal, and has a control terminal that receives a control signal LS_CS 154. The HS switch 120 is coupled to the LS switch 128 at a switching terminal 135, which has a voltage $V_{SW}$. In at least one example, the HS switch 120 and the LS switch 128 are p-channel field-effect transistors ("PFETs"). The inductor 136 is coupled between the switching terminal 135 and an output voltage terminal 140 that provides an output voltage $V_{OUT}$. Output capacitor $C_{OUT}$ 144 is coupled between the output voltage terminal 140 and the ground terminal. A load 142 is coupled between the output voltage terminal 140 and the ground terminal.

The controller 148 includes valley control circuitry 155, peak control circuitry 158, light load detection circuitry 164, mode control logic 170, and driver circuit 184. Controller 148 has a first input coupled to the power supply 102 that receives the input voltage $V_{IN}$ 104. Controller 148 has a second input coupled to the switching terminal 135 that receives the switching voltage $V_{SW}$. Controller 148 has a third input coupled to the output voltage terminal 140 that receives the output voltage $V_{OUT}$.

Valley control circuitry 155 has an input that receives a control signal CS1. In some examples, CS1 includes a valley threshold and an inductor current sense signal, and CS1 may be one or more signals. In at least one example, the valley threshold and the inductor current sense signal may be ramped. Peak control circuitry 158 receives a control signal CS2. In some examples, CS2 includes a peak threshold and an inductor current sense signal. Light load detection circuitry 164 receive control signal CS3. In at least one example, CS3 includes a control voltage and a light load threshold. In some examples, the control voltage controls the output current of the power stage 106 and indicates the output current level. Accordingly, one option to detect a light load condition involves monitoring the control voltage relative to a threshold.

Mode control logic 170 has a first input coupled to an output of the valley control circuitry 155, a second input coupled to an output of the peak control circuitry 158, and a third input coupled to an output of the light load detection circuitry 164. Mode control logic 170 has a first output coupled to a first input of driver circuit 184, and a second output coupled to a second input of driver circuit 184. Mode control logic 170 is configured to provide a ripple control signal, Sel_i_ripple 178, at a third output. Driver circuitry 184 has a first output HS_CS 152 which is coupled to the control terminal of HS switch 120. Driver circuitry 184 has a second output LS_CS 154 that is coupled to the control terminal of LS switch 128.

The controller 148 provides HS_CS 152 and LS_CS 154, respectively, in response to the voltages $V_{IN}$, $V_{SW}$, $V_{OUT}$ and ground, and the operations of the valley control circuitry 155, the peak control circuitry 158, the light load detection circuitry 164, the mode control logic 170, and the driver circuit 184. In some examples, the controller 148 may be configured to sense inductor current of the power stage and adjust an offset between a valley threshold and a peak threshold in response to a light load condition being detected by the light load detection circuitry 164. The controller 148 may be configured to transition from a PWM mode to a PFM mode in response to the light load condition combined with a comparison indicating the sensed inductor current reaches the peak threshold. The comparison is performed, for example, by the peak control circuitry 158.

The power stage 106 provides the output voltage $V_{OUT}$ at the output voltage terminal 140, and provides $V_{SW}$ at the switching terminal 135 responsive to the voltages $V_{IN}$ 104, HS_CS 152, and LS_CS 154. The HS switch 120 couples the input voltage terminal 104 to the switching terminal 135 responsive to HS_CS 152, which increases the current in the inductor 136. The LS switch 128 couples the ground terminal to the switching terminal 135 responsive to LS_CS 154, which decreases the current in the inductor 136. The load current provided to the load 142 is the average current through the inductor 136.

The PFM pulse size may be selected to achieve good efficiency and to avoid high output voltage ripple or mode bouncing between the PFM and PWM modes. In some examples, the controller 148 is configured to optimize efficiency by entering the PFM mode at light loads when the inductor current falls below zero current while operating in the PWM mode. In the case of a light load, the maximum PFM output current is selected to be larger than the load current to avoid bouncing between PWM mode and PFM mode, and to avoid overshoots or undershoots in the output voltage $V_{OUT}$ 140. The PFM pulse is selected to be larger than the current ripple in the PWM mode.

Conditions that may cause a variance in the inductor current ripple when operating in the PWM mode include variances in the input voltage $V_{IN}$ 104, the output voltage $V_{OUT}$ 140, the operating frequency, and the inductance of inductor 136. In some cases, the inductance of the inductor 136 may vary up to +/−30%, and an example operating frequency may vary up to +/-20%. Also, in at least one example, the input voltage $V_{IN}$ 104 may vary between 2.5V and 40V. An example output voltage $V_{OUT}$ 140 may vary from 0.3 to 6V. Each of these variances can cause the inductor current ripple to vary. Due at least in part to the inductor current ripple variance, the appropriate peak current value for the PFM pulse in a high ripple condition can cause significant voltage ripple in a low ripple condition. Conversely, the appropriate PFM pulse for a low ripple condition can cause inefficiency and mode bounce in a high ripple condition.

The controller 148 adjusts the PFM pulse peak current value responsive to inductor current ripple in the PWM mode. In at least some examples, the peak control circuitry 158 controls the peak current limit in the PWM mode and defines the PFM pulse peak current value in the PFM mode. For example, the peak threshold may be a valley current level plus an offset. In some examples, the offset is digitally controlled. In the PFM mode, the controller 148 may set the valley current level to zero, and the reference level for the PFM peak current value is determined by the offset.

In the PWM mode, the controller 148 uses a fixed frequency valley current mode to regulate the output voltage $V_{OUT}$ 140 by adapting the valley current level as needed. In the case of a current mode buck power converter operating in timer based PFM mode, a current control loop is used to adapt the PFM frequency. The PFM pulse is adapted based on the inductor current ripple in PWM mode to optimize the output voltage ripple and converter efficiency.

Figures 2, 3:
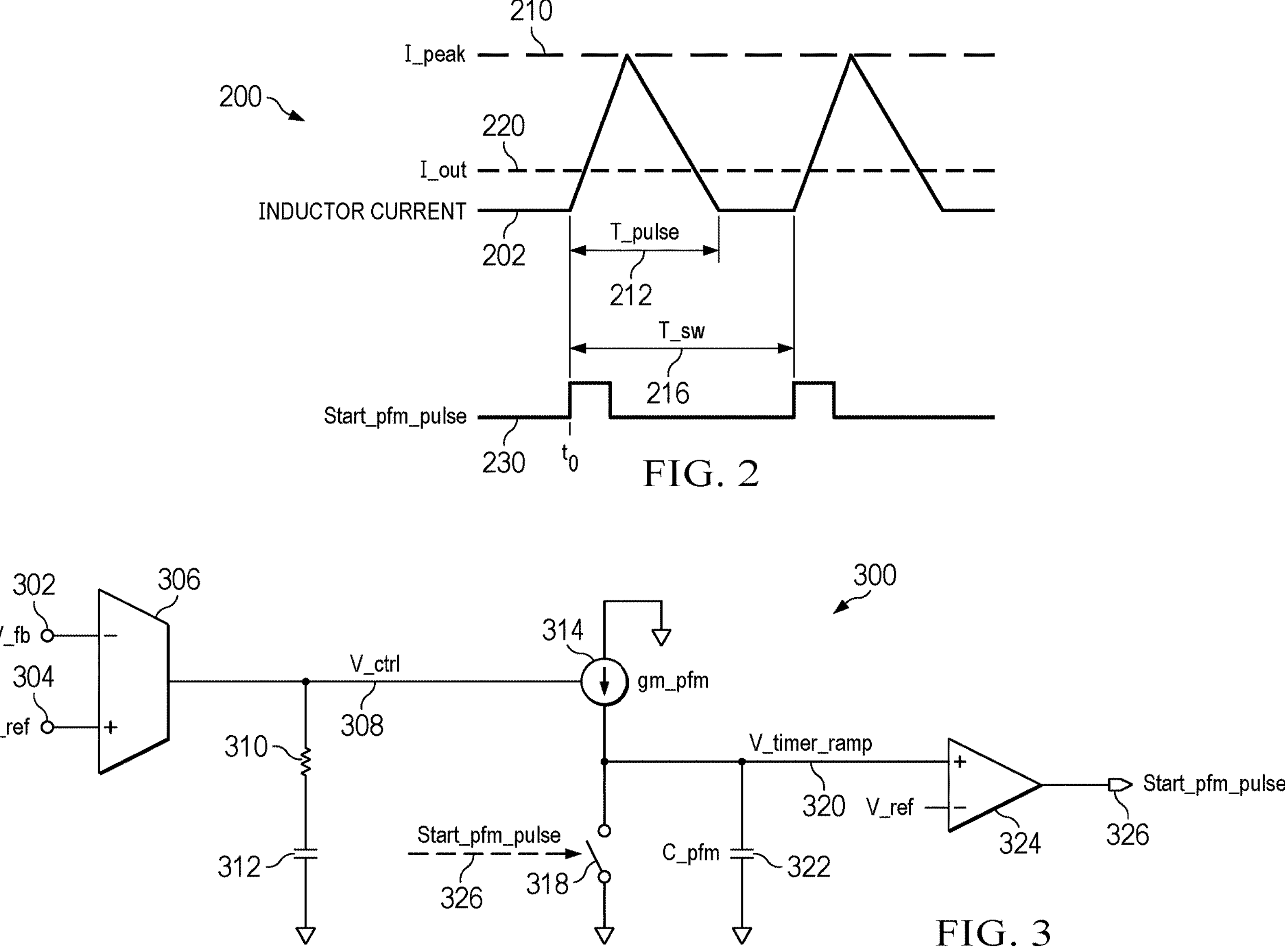
FIG. 2 shows a diagram of inductor current versus time for an example voltage converter system operating in pulse frequency mode.
FIG. 3 shows a block diagram for an example PFM timing circuit.

FIG. 2 shows a diagram 200 of inductor current versus time for an example voltage converter system operating in pulse frequency mode (PFM). Graph 210 shows a peak output current level for the voltage converter, I_peak. Graph 220 shows an average output current level for the voltage converter, I_out. Graph 202 shows the inductor current being delivered to the output voltage terminal versus time. Graph 230 shows the Start_pfm_pulse 230, which triggers the start of each PFM cycle, versus time.

A pulse occurs on the Start_pfm_pulse signal 230 at time to. In response to the pulse, the high side switch is turned on coupling the input voltage from the power supply to the switching terminal. This causes current to flow through the inductor and to the output capacitance creating a ramp in the inductor current 202. The inductor current 202 continues to rise until it reaches the peak output current level I_peak 210. In response to the inductor current 202 reaching the peak output current level I_peak 210, the high side switch is turned off and the low side switch is turned on, coupling the switching terminal to the ground terminal. The inductor current begins decreasing and continues to decrease until it reaches zero. The converter will remain in a high impedance state and the inductor current 202 will remain at zero until the next pulse on the Start_pfm_pulse signal 230 occurs.

The time from the rising edge of the Start_pfm_pulse signal 230 until the inductor current 202 ramps back down to zero is T_pulse 212. Subsequently, another pulse occurs on the Start_pfm_pulse signal 230, and the inductor current 202 begins to ramp up again until it reaches the peak output current level I_peak 210. The time from the rising edge of a particular Start_pfm_pulse signal 230 until the rising edge of the subsequent Start_pfm_pulse signal 230 is T_SW 216, which is the PFM pulse period. The average output current I_out 220 is determined by the period (or frequency) and the magnitude of the PFM pulses. $I_{OUT}$ 220 is the average inductor current, and its value can be calculated using equation (1) as half of the peak current multiplied by the ratio of the pulse width to the period between consecutive pulses.

$$I_{out} = \frac{I_{peak}}{2} * \frac{T_{pulse}}{T_{SW}} \tag{1}$$

FIG. 3 shows a block diagram for an example PFM timing circuit 300. Amplifier 306 has a first input coupled to a feedback voltage terminal that provides a feedback voltage V_fb 302. The feedback voltage V_fb 302 is a voltage proportional to the output voltage of the power converter. Amplifier 306 has a second input coupled to a reference voltage terminal that provides a reference voltage V_ref 304. The reference voltage V_ref 304 is proportional to the desired voltage at the output voltage terminal. Amplifier 306 has an output that is coupled to the control terminal of a current source gm_pfm 314. Resistor 310 and capacitor 312 are coupled in series between the output of amplifier 306 and a ground terminal.

Current source gm_pfm 314 has a first terminal coupled to a voltage source, a second terminal coupled to a switch 318 and capacitor C_pfm 322, and a control terminal receiving the signal V_ctrl 308 from the output of amplifier 306. Comparator 324 has a first input coupled to the second terminal of current source gm_pfm 314, and receives a signal V_timer_ramp 320. Comparator 324 has a second input coupled to the reference voltage terminal, and receives the reference voltage V_ref 304. Capacitor 322 C_pfm is coupled between the first input of comparator 324 and the ground terminal. Comparator 324 provides a signal Start_pfm_pulse 326 at its output.

The circuitry of PFM timing circuit 300 converts a compensating voltage, V_ctrl 308, at the output of amplifier 306 to a time period. This conversion is accomplished using compensating voltage V_ctrl 308 to control the amount of current provided by current source gm_pfm 314 to capacitor C_pfm 322, which creates a voltage V_timer_ramp 320 across capacitor C_pfm 322. The voltage V_timer_ramp 320 is provided to comparator 324, which compares that voltage to the reference voltage V_ref 304. The comparison of V_timer_ramp 320 to V_ref 304 controls the length of the pulse period t_sw 216. When the pulse period t_sw elapses, a subsequent PFM pulse is triggered by the Start_pfm_pulse 326.

Resistor 310 and capacitor 312 are coupled in series to the output of amplifier 306 and form a proportional-integral (P-I) compensator for the voltage V_ctrl 308. That voltage controls the transconductance ($g_m$) of the timer, which operates similarly to a voltage-controlled oscillator in which the voltage V_ctrl 308 is controlling the oscillation frequency.

The Start_pfm_pulse signal 326 is provided by the output of comparator 324. Start_pfm_pulse signal 326 is provided at the control terminal of switch 318 to control the switch. In response to the Start_pfm_pulse signal 326 causing switch 318 to open, the current from current source gm_pfm 314 begins charging capacitor C_pfm 322, causing the voltage V_timer_ramp 320 to increase linearly. In response to the voltage V_timer_ramp 320 crossing the reference voltage V_ref 304, the output of comparator 324 goes high, triggering a Start_pfm_pulse 326.

The buck controller generates the Start_pfm_pulse 326, and switch 318 is opened. The power stage of the voltage converter generates a current pulse through the output inductor, and the voltage timer ramp cycle begins again with a subsequent rising Start_pfm_pulse 326. As the voltage at V_ctrl 308 increases, the current provided by current source gm_pfm 314 increases, and the voltage ramp of V_timer_ramp 320 across C_pfm 322 becomes steeper (i.e. higher slew rate). As the voltage ramp of V_timer_ramp 320 becomes steeper, the Start_pfm_pulse 326 triggers earlier, which generates faster pulses and increases the average output current $I_{OUT}$ 220.

If the output current $I_{OUT}$ 220 demand increases, the output voltage may begin to drop. A drop in the output voltage causes a drop in the feedback voltage V_fb 302, which increases the voltage V_ctrl 308 at the output of amplifier 306. Increasing the voltage V_ctrl 308 increases the amount of current supplied by current source gm_pfm 314, charging the capacitor C_pfm 322 more quickly, which makes the output of comparator 324 trip faster. As a result, the period in which the inductor current is zero decreases and a new Start_pfm_pulse 326 is generated sooner, which increases the average output current $I_{OUT}$ 220.

The PFM gain is the ratio of the change in average output current $I_{OUT}$ to the change in voltage V_ctrl 308 at the output of amplifier 306. There is a voltage-to current conversion from the voltage V_ctrl 308 to the current output from current source gm_pfm 414, and this circuitry forms a voltage-to-current converter. An equation for calculating the PFM gain is given by equation (2):

$$\text{Gain}_{pfm} = \frac{\Delta I_{out}}{\Delta V_{ctrl}} = \frac{T_{pulse} * gm_{pfm}}{V_{ref} * C_{pfm}} \tag{2}$$

The PFM gain depends on the pulse width, the transconductance of the current source, the capacitance of C_pfm 322 and the reference voltage V_ref 304. Different applications may have different input voltages and output voltages, and different tolerances for the inductance of the inductor.

These variations in parameters can lead to higher current ripple in some applications, or smaller current ripple in other applications. The magnitude of the current ripple affects the PFM gain, causing the gain from the voltage V_ctrl 308 at the output of amplifier 306 to output current to vary significantly. This variation in gain can cause significant problems including increased ripple on the output current and voltage, control loop instability, and unstable transitions between PWM mode and PFM mode.

A potential solution to the problems caused by the variation of PFM gain is to change the pulse frequency based on the inductor current ripple. The reference voltage level provided to the PFM timer comparator can be adapted and varied in response to the PFM pulse amplitude. This makes the reference voltage V_ref no longer a constant DC level voltage, but instead adjustable.

Figure 4:
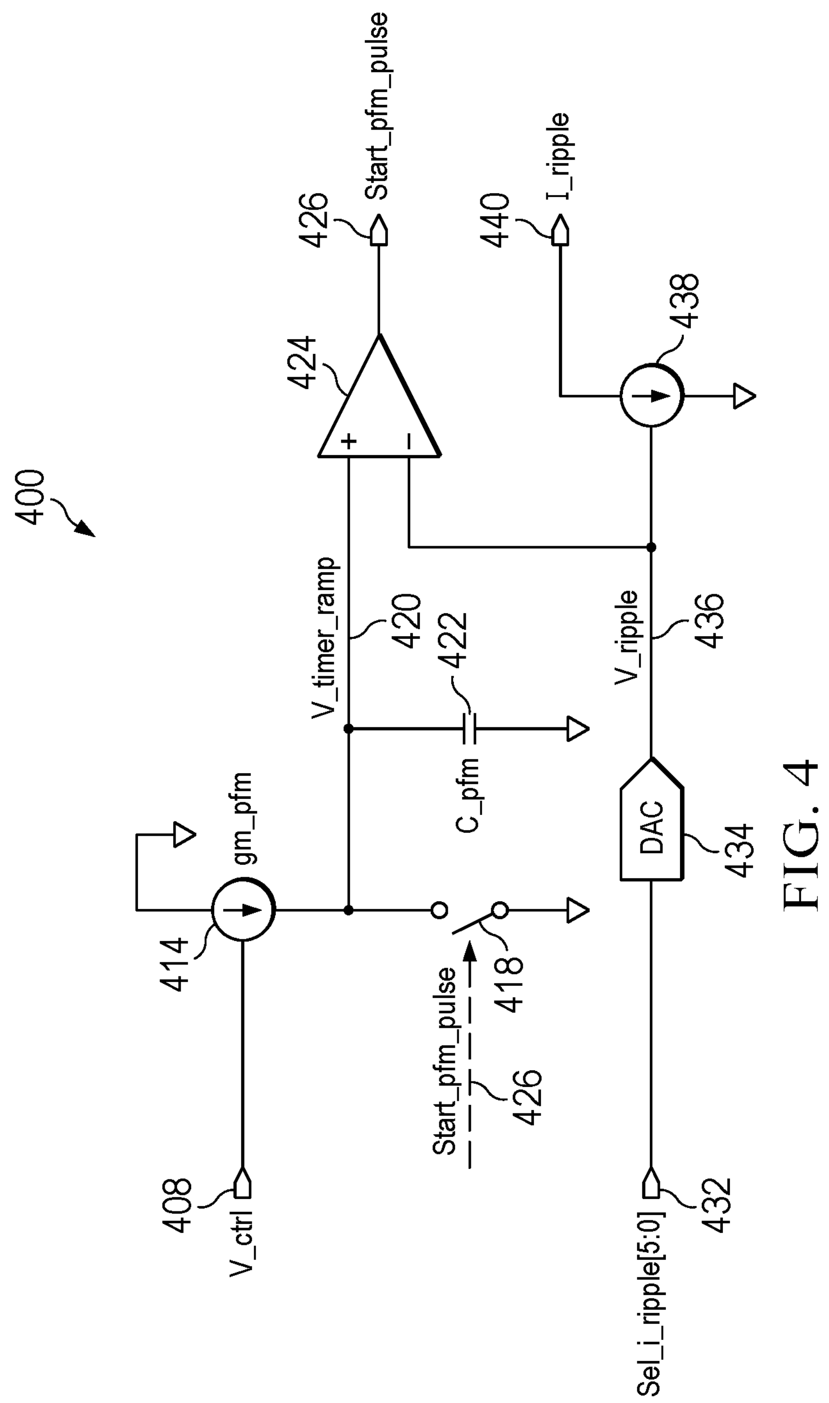
FIG. 4 shows a schematic diagram for an example PFM timing circuit with an adapted reference voltage.

FIG. 4 shows a schematic diagram for an example PFM timing circuit with an adapted reference voltage. The signal V_ctrl 408 is a signal proportional to the difference in voltage between the output voltage of a regulator and a reference voltage representing a desired output voltage. In at least one case, the signal V_ctrl 408 is provided from the output of a voltage error amplifier. The signal V_ctrl 408 is provided to the control terminal of a current source gm_pfm 414.

The current source gm_pfm 414 has a first terminal coupled to a voltage source, a second terminal coupled to a switch 418, and a control terminal receiving the signal V_ctrl 408. Comparator 424 has a first input coupled to the second terminal of current source g,_pfm 414 that receives a signal V_timer_ramp 420. Comparator 424 has a second input that receives a reference voltage V_ripple 436.

Capacitor 422 C_pfm is coupled between the first input of comparator 424 and the ground terminal. Comparator 424 provides a signal Start_pfm_pulse 426 at its output, which is coupled to the control terminal of switch 418. Switch 418 is coupled between current source gm_pfm 414 and the ground terminal, and has a control terminal coupled to the output of comparator 424. Capacitor C_pfm 422 is coupled between the first input of comparator 424 and the ground terminal.

Digital-to-analog converter (DAC) 434 has an input that receives a digital signal Sel_i_ripple 432. In one example, the digital signal Sel_i_ripple 432 comprises six bits, but Sel_i_ripple 432 could comprise more or less than six bits in other examples. The output of DAC 434 is coupled to the second input of comparator 424 and to a control terminal of current source 438. DAC 434 provides a signal V_ripple 436 at its output that is an analog conversion of Sel_i_ripple 432. The signal V_ripple 436 is also provided to the control terminal of current source 438. Current source 438 provides a current signal I_ripple 440.

The magnitude of V_CTRL 408 controls the magnitude of the current that is provided by current source gm_pfm 414 for charging capacitor C_pfm 422. The output of DAC 434, which is the signal V_ripple 436, provides the reference voltage that the signal V_timer_ramp 420 is compared to using comparator 424. The signal V_ripple 436 also controls the reference current level for an output current peak comparator. The reference current level is set by controlling the magnitude of the current provided by current source 438 as the signal I_Ripple 440. The reference current level for I_peak is equal to the sum of I_ripple and I_CTRL. The value of I_CTRL defines the valley current level, and the value of I_ripple defines the current ripple between comparators.

The signal V_ripple 436, which is the output of DAC 434, determines the peak current of the PFM pulse, and provides an input to comparator 424. At its output, comparator 424 provides the Start_PFM_pulse that triggers each respective PFM pulse. The current ripple in PWM mode is measured, and the difference between the peak value and the valley value is used to generate a reference voltage for comparator 424, which allows the PFM gain to remain constant under different operating conditions. The control loop gain can be designed to be the same in PFM mode as it is in PWM mode.

Figure 5:
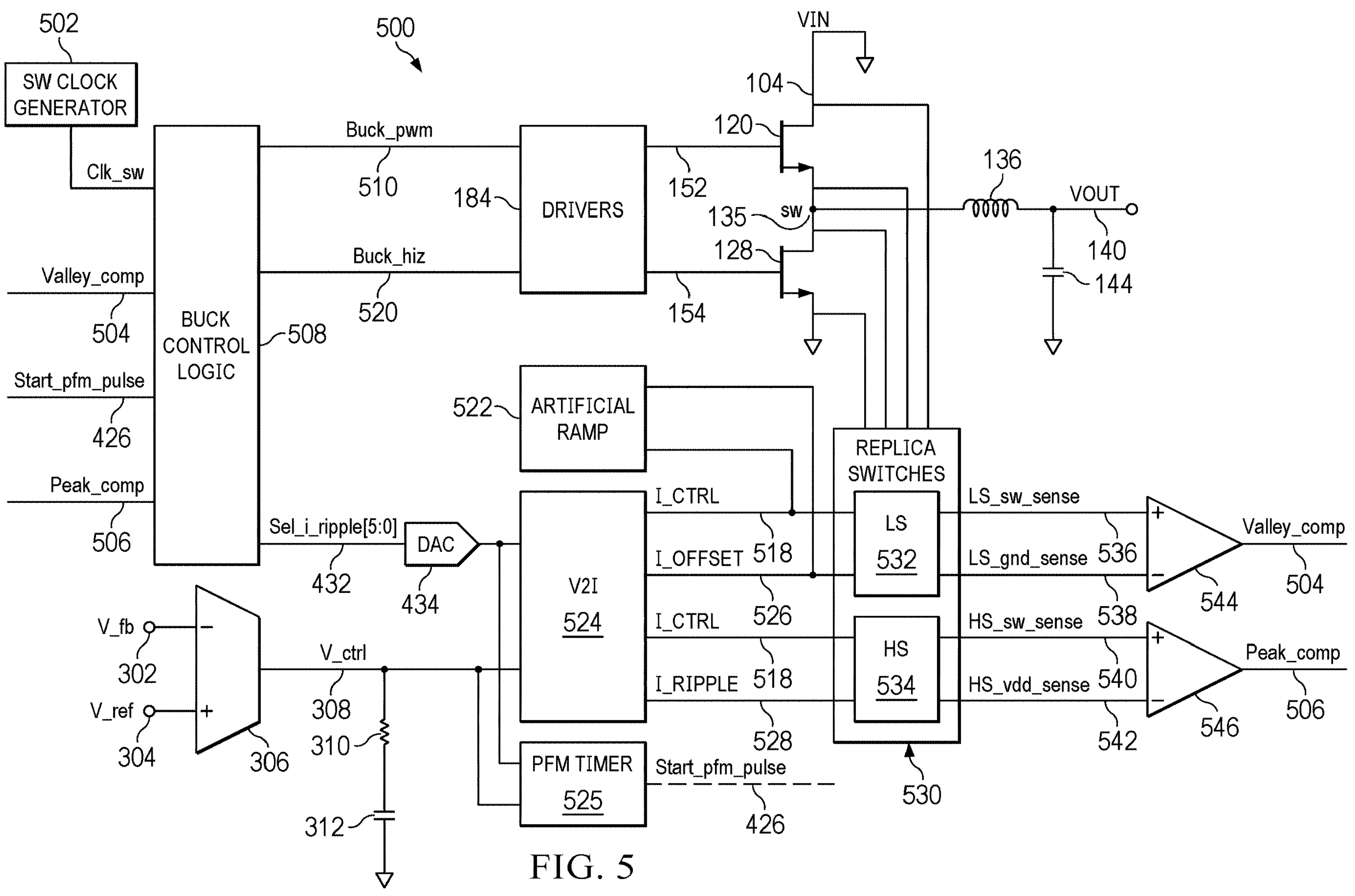
FIG. 5 shows a block diagram for an example buck power converter having a PFM timing circuit with an adapted reference voltage.

FIG. 5 shows a block diagram for an example buck power converter 500 having a PFM timing circuit with an adapted reference voltage. The switch clock generator 502 provides a clock signal Clk_SW, which is a first input to buck control logic circuit 508. A second input to buck control logic circuit 508 is Valley_Comp 504, which is the output signal of a current comparator that detects a zero current level in PFM mode. In PWM mode, a valley comparator defines the controlled valley current level. A third input to buck control logic circuit 508 is Peak_Comp 506, which is the output of a current comparator that detects a peak inductor current level. A fourth input to buck control logic circuit 508 is the signal Start_pfm_pulse 426. Buck control logic circuit 508 may include digital logic gates or can be a processor or a microcontroller.

A first output of buck control logic circuit 508 is Buck_pwm 510, which is provided as a first input to driver circuit 184. A second output of buck control logic circuit 508 is Buck_hiz, which is provided as a second input to driver circuit 184. A first output of driver circuit 184, HS_CS 152, is coupled to the control terminal of HS switch 120. A second output of driver circuit 184, LS_CS 154, is coupled to the control terminal of LS switch 128. HS switch 120 is coupled to LS switch 128 at the switching terminal SW 135. Inductor 136 is coupled between the switching terminal SW 135 and the output voltage terminal VOUT 140. Output capacitor COUT 144 is coupled between the output voltage terminal VOUT 140 and the ground terminal.

Figure 6:
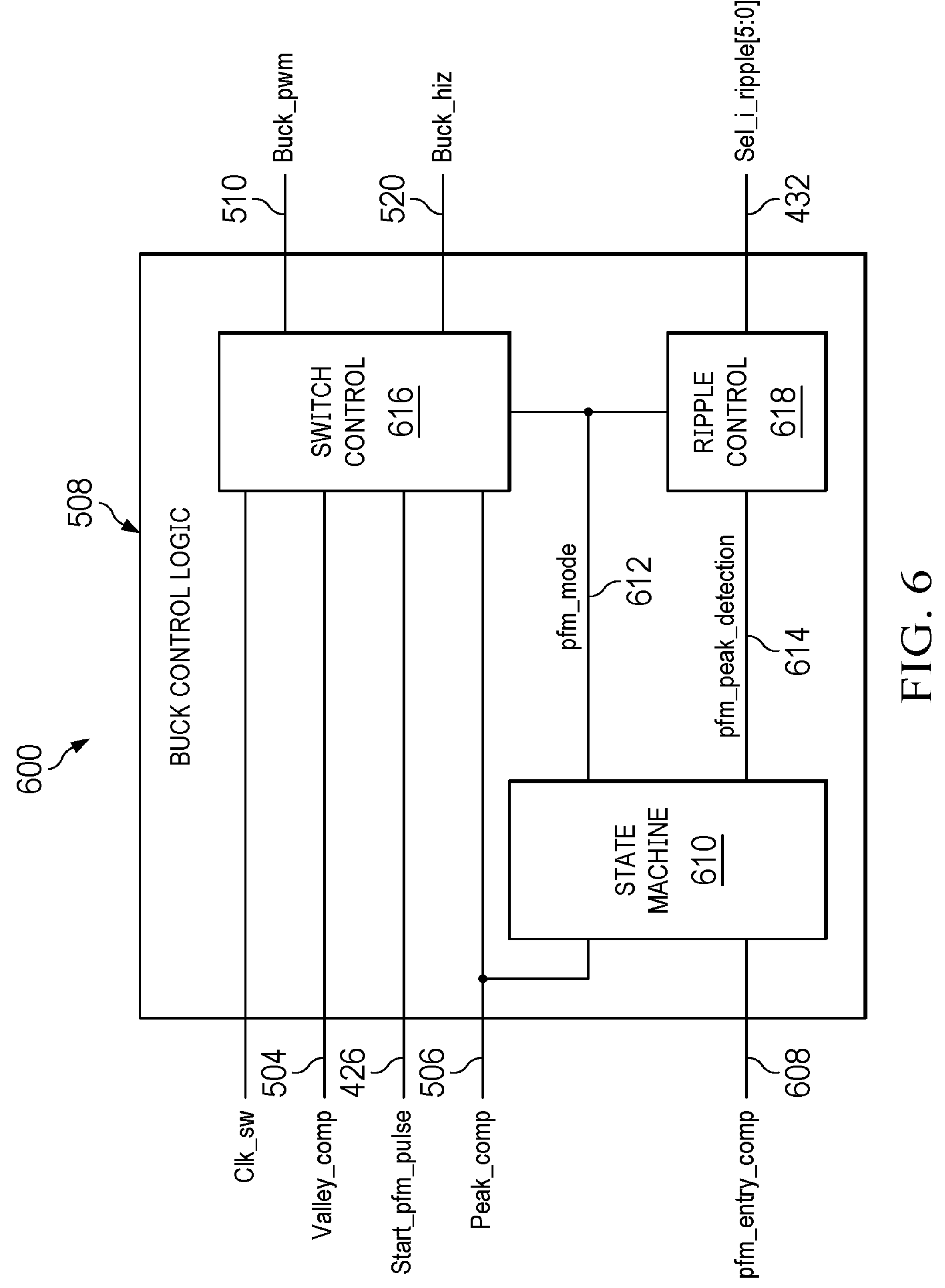
FIG. 6 shows a block diagram for an example circuit of a buck control logic circuit.

FIG. 6 shows a block diagram for an example circuit 600 for buck control logic circuit 508. Buck control logic circuit 508 includes switch control circuitry 616, state machine circuitry 610, and ripple control circuitry 618. The switch clock signal Clk_SW is a first input to switch control circuitry 616. A second input to switch control circuitry 616 is Valley_Comp 504, and a third input to switch control circuitry 616 is Peak_Comp 506. A fourth input to switch control circuitry 616 is the signal Start_pfm_pulse 426.

A first input of state machine circuitry 610 is coupled to the third input of switch control circuitry 616, and receives the Peak_Comp 506 signal. A second input of state machine circuitry 610 receives the signal PFM_Entry_Comp 608. A first output of the state machine circuitry 610 provides the signal PFM_Peak_Detection 614 to ripple control circuitry 618. A second output of the state machine circuitry 610 provides the signal PFM_Mode 612, which is provided as a second input to ripple control circuitry 618, and as a fifth input to switch control circuitry 616.

The state machine circuitry 610 is configured to receive Peak_Comp 506 and PFM_Entry_Comp 608, and provide a PFM mode signal PFM_Mode 612, and a PFM peak detection signal PFM_Peak_Detection 614. The ripple control circuitry 618 is configured to receive PFM_Peak_Detection 614 and PFM_Mode 612, and provide the ripple control signal Sel_I_Ripple 432. After PFM_Peak_Detection 614 is asserted, the ripple control circuitry 618 decreases the ripple control signal Sel_I_Ripple 432 periodically until the signal PFM_Mode 612 is asserted or PFM mode entry is canceled. The switch control circuitry 616 is configured to receive CLK_SW, Valley_Comp 504, Start_PFM_pulse 426, Peak_Comp 506 and PFM_Mode 612, and to provide Buck_pwm 510 and Buck_hiz 520.

The input of DAC 434 is coupled to buck control logic circuit 508 and receives the ripple control signal Sel_I_Ripple 432. In at least one example, the ripple control signal Sel_I_Ripple 432 is a six-bit digital word, but Sel_I_Ripple 432 can be more or less bits in other examples. The output of DAC 434 is coupled to a first input of voltage-to-current (V2I) circuit 524.

Amplifier 306 has a first input coupled to a feedback voltage terminal that provides a feedback voltage V_fb 302. The feedback voltage V_fb 302 is a voltage proportional to the output voltage VOUT 140 of the power converter. Amplifier 306 has a second input coupled to a reference voltage terminal that provides a reference voltage V_ref 304. The reference voltage V_ref 304 is proportional to the desired voltage at the output voltage terminal VOUT 140. Amplifier 306 has an output that is coupled to a second input of V2I circuit 524. Resistor 310 and capacitor 312 are coupled in series between the output of amplifier 306 and the ground terminal. PFM timer circuit 526 has first, second and third outputs. The first and second outputs are coupled to the first and second inputs of V2I circuit 524, respectively, and the third output provides the Start_pfm_pulse signal 426.

Replica switches 530 include LS replica switches 532 and HS replica switches 534. A first output of V2I circuit 524 is coupled to a first input of LS replica switches 532 and to a first input of HS replica switches 534, and provides the control signal I_CTRL 518. A second output of V2I circuit 524 is coupled to a second input of LS replica switches 532 and provides the signal I_OFFSET 526. A third output of V2I circuit 524 is coupled to a second input of HS replica switches 534 and provides the signal I_RIPPLE 528.

HS replica switches 534 generates differential sense and reference signals HS_sw_sense 540 and HS_vdd_sense 542 based on the current through HS switch 120 and control signals I_CTRL 518 and I_RIPPLE 528. Control signals I_CTRL 518 and I_RIPPLE 528 generate voltage drops across HS replica switches 534 which is relative to the voltage drop across HS switch 120. LS replica switches 532 generates differential sense and reference signals LS_sw_sense 536 and LS_gnd_sense 538 based on the current through LS switch 128 and control signals I_CTRL 518 and I_OFFSET 526. Control signals I_CTRL 518 and I_OFFSET 526 and ramp signals from artificial ramp circuit 522 generate voltage drops across LS replica switches 532 which is relative to the voltage drop across LS switch 128.

Artificial ramp circuit 522 has a first output coupled to the first input of replica switches 530 and a second output coupled to the second input of replica switches 530. A first output of replica switches 530 provides the signal LS_sw_sense 536. A second output of replica switches 530 provides the signal LS_gnd_sense 538. A third output of replica switches 530 provides the signal HS_sw_sense 540. A fourth output of replica switches 530 provides the signal HS_vdd_sense 542.

Comparator 544 has a first input coupled to the first output of replica switches 530 and receives the signal LS_sw_sense 536. A second input of comparator 544 is coupled to the second output of replica switches 530 and receives the signal LS_gnd_sense 538. The output of comparator 544 is coupled to the second input of buck control logic circuit 508, and provides the signal Valley_comp 504. Comparator 546 has a first input coupled to the third output of replica switches 530 and receives the signal HS_sw_sense 540. A second input of comparator 546 is coupled to the fourth output of replica switches 530 and receives the signal HS_vdd_sense 542. The output of comparator 546 is coupled to the third input of buck control logic circuit 508, and provides the signal Peak_comp 504.

The peak current through HS switch 120 and the valley current through LS switch 128 are measured while the power converter is operating in PWM mode, prior to entering PFM mode. The information is provided to Buck control logic circuit 508, which produces a digital output Sel_i_ripple 432. The signal Sel_i_ripple 432 is provided as an input to DAC 434. The value of Sel_i_ripple 434 is ramped down until the inductor current flowing through the HS switch 120 that is measured by HS replica switches 534 and comparator 546 equals the reference level I_peak 210. The output of DAC 434 is provided as an input to V2I circuit 524 and to PFM timer circuit 525.

When operating in the PFM mode and a Start_pfm_pulse occurs, the inductor current ramps up until it reaches the reference level I_peak 210, which is defined by DAC 434, and causes the Peak_comp signal 506 at the output of comparator 546 to be asserted. In response to the inductor current reaching the level of I_peak 210, the inductor current begins decreasing. In response to the inductor current reaching a zero current level, comparator 544 produces a signal at its output, Valley_Comp 504, which causes buck control logic circuit 508 to produce a Buck_hiz signal 520 to be asserted. Asserting Buck_hiz 520 causes the outputs of driver circuit 184 to be placed into a high impedance state, and no current will flow through HS switch 120 and LS switch 128. A subsequent start_pfm pulse 426 will trigger, and the PFM cycle will repeat.

The input to DAC 434 determines the magnitude of I_Ripple 528, which controls the reference voltage level for comparator 546. The output of DAC 434 is used in the PFM timer to define the reference level for the timer comparator in PFM timer circuit 525, which affects the frequency of the PFM pulse. However, in at least one example, a separate DAC can be used for the PFM timer circuit reference level. Some advantages that buck power converter 500 may provide are lower ripple on the output current and voltage signals, and better stability and cleaner transitions switching between PWM mode and PFM mode.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, the term "couple" may cover connections, communications or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, so device B is controlled by device A via the control signal generated by device A.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A circuit comprising:

a comparator having first and second comparator inputs and a comparator output, wherein the second comparator input is coupled to a variable reference voltage terminal;

a switch coupled between the first comparator input and a ground terminal, and having a switch control terminal coupled to the comparator output, the switch being enabled responsive to the comparator output having a first state and disabled responsive to the comparator output having a second state;

a capacitor coupled between the first comparator input and the ground terminal;

a first current source coupled between a supply terminal and the first comparator input, and having a first current control terminal; and a second current source coupled between a current output terminal and the ground terminal, and having a second current control terminal, the second current control terminal coupled to the variable reference voltage terminal.

2. The circuit of claim 1, further comprising a digital-to-analog converter (DAC) having a DAC input and a DAC output, wherein the DAC input is coupled to a ripple control signal terminal, and the DAC output is coupled to the variable reference voltage terminal.

3. The circuit of claim 2, further comprising a control logic circuit having first, second and third control logic inputs and a control logic output, wherein the first control logic input is coupled to a clock source, the second control logic input is coupled to the comparator output, and the control logic output is coupled to the ripple control signal terminal.

4. The circuit of claim 3, wherein the DAC input receives a digital ripple control signal from the ripple control signal terminal, and the DAC output provides an analog conversion of the digital ripple control signal.

5. The circuit of claim 4, wherein the digital ripple control signal includes six bits.

6. The circuit of claim 4, further comprising an amplifier having first and second amplifier inputs and an amplifier output, wherein the first amplifier input is coupled to a power converter feedback terminal, the second amplifier input is coupled to a power converter reference terminal, and the amplifier output is coupled to the first current control terminal.

7. The circuit of claim 6, wherein the capacitor is a first capacitor and the circuit is further comprising a resistor and a second capacitor coupled in series between the amplifier output and the ground terminal.

8. The circuit of claim 6, wherein the comparator, the switch, the capacitor, and the first and second current sources are part of a timer circuit configurable to set a switching frequency of the comparator output responsive to a first voltage at the power converter feedback terminal, a second voltage at the power converter reference terminal, and a third voltage at the variable reference voltage terminal.

9. The circuit of claim 8, wherein the switching frequency of the comparator output sets a switching frequency of a power converter in a first mode, and the control logic circuit is configurable to set the third voltage responsive to a state of the power converter in a second mode prior to transitioning to the first mode.

10. The circuit of claim 9, wherein the state includes a magnitude of a current ripple of the power converter.

11. The circuit of claim 9, wherein the control logic circuit is configurable to set a peak current of the power converter in the first mode responsive to an output of the second current source.

12. The circuit of claim 9, wherein the control logic circuit is configurable to set a switching frequency of the power converter at a constant value in the second mode.

13. The circuit of claim 9, wherein the first mode is a pulse frequency modulation (PFM) mode, and the second mode is a pulse width modulation (PWM) mode.

14. The circuit of claim 6, further comprising a V2I circuit having inputs coupled to the DAC output and the amplifier output, the V2I circuits having outputs coupled to the third control logic input.

15. The circuit of claim 14, further comprising a valley detection circuit and a peak detection circuit coupled between the V2I circuit and the third control logic input.

* * * * *